United States Patent [19]
Farnam

[11] 3,811,689
[45] May 21, 1974

[54] PREFORMED BUSHING

[75] Inventor: Robert G. Farnam, New Lisbon, Wis.

[73] Assignee: F. D. Farnam Co., New Lisbon, Wis.

[22] Filed: Aug. 2, 1972

[21] Appl. No.: 277,389

[52] U.S. Cl............... 277/166, 277/180, 277/235 B
[51] Int. Cl......................... F10j 15/06, F16j 15/10
[58] Field of Search........ 277/166, 235 B, 227, 180, 277/233, 211

[56] References Cited
UNITED STATES PATENTS

| | | | |
|---|---|---|---|
| 3,655,210 | 4/1972 | Farnam | 277/235 B |
| 1,980,335 | 11/1934 | Hewitt et al. | 277/166 X |
| 2,395,243 | 2/1946 | Aukers | 227/235 B |
| 2,681,241 | 6/1954 | Aukers | 277/235 B |
| 3,606,361 | 9/1971 | Pohl et al. | 277/235 B |
| 2,795,444 | 6/1957 | Nenzell | 277/180 |
| 2,887,330 | 5/1959 | Cobb | 277/94 X |

Primary Examiner—Samuel B. Rothberg
Attorney, Agent, or Firm—Mann, Brown, McWilliams & Bradway

[57] ABSTRACT

Annular bushings are provided with a circumferential projection or groove to index and retain the bushings in place in laminated insulator gaskets.

7 Claims, 6 Drawing Figures

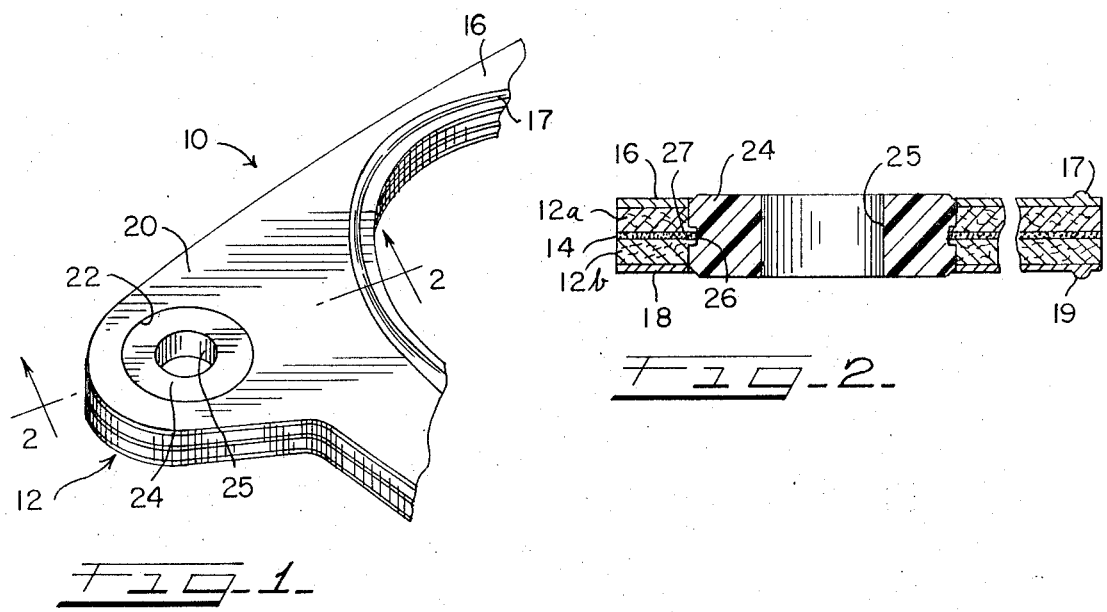
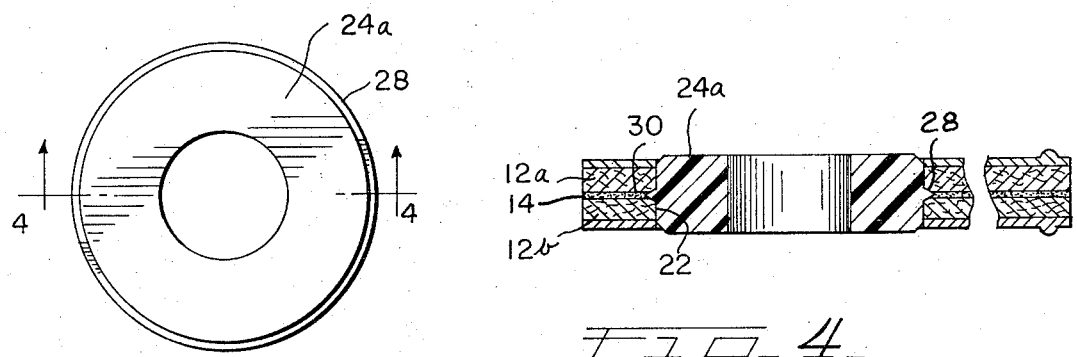
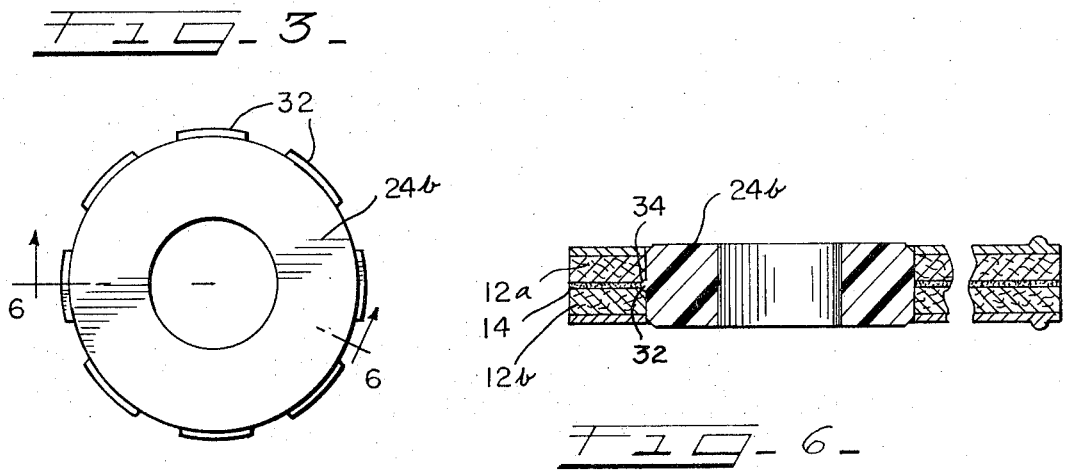

PREFORMED BUSHING

BACKGROUND OF THE INVENTION

This invention relates to non-metallic bushings which are used in laminated gaskets to take the torque load when the gaskets are clamped in place. More particularly, this invention relates to bushings for use in heat insulator gaskets of the type described in Farnam et al. U.S. Pat. No. 3,655,210, issued Apr. 11, 1972.

In the environment of the bolt hole portions of such gaskets, it is desired to have a relatively low $k$ factor (heat transmission ratio), and therefore non-metallic, asbestos fiber-reinforced phenolic resin material has been found to be highly desirable. Those bushings are of uniform cylindrical configuration and are held in place by frictional fit, and/or by adhesion with the thermal setting resinous material. Bushings in similar gaskets have been secured in place by means of an intermediate metal plate through which the bushing was pressed to form a frictional fit. Positioning of these uniform bushings requires a great deal of care to insure the proper relationship between the bushing surfaces, the flange surfaces and the gasket surfaces. These bushings can be moved out of position and even pushed from the gasket structure with a low to moderate amount of force. Such removal causes the parts to seat improperly and may cause damage to the machinery by the bushings falling into open areas.

It is an object of the present invention to provide a bushing which may easily be secured in the gasket structure. Similarly, it is an object of the invention to provide that the bushing may be permanently fixed in place. It is a further object to provide a means to readily index the bushing in relation to the gasket surfaces. Additionally, it is an object of the invention to provide a means to interlock the bushing into the body of the gasket so that the forces necessary to dislodge the bushing will tear away a portion of the body of the gasket.

SUMMARY OF THE INVENTION

In accordance with the invention, the bushings used in a gasket structure such as a heat insulating carburetor gasket, are provided with projections disposed around the peripheral surface of the bushing so that it is imbedded in and underlies a portion of the gasket structure in the bolt hole portion. In an alternative embodiment, rather than a projection, a peripheral groove may be provided.

DESCRIPTION OF THE DRAWINGS

Other objects and advantages of the invention will become apparent upon reading the following detailed description and upon reference to the drawings in which:

FIG. 1 is a fragmentary perspective view of a typical heat insulating gasket;

FIG. 2 is a sectional view of FIG. 1 along line 2—2, and showing one embodiment of the invention;

FIG. 3 is a plan view of a preferred embodiment of the invention;

FIG. 4 is a sectional view of FIG. 3 along line 4—4;

FIG. 5 is a plan view of another embodiment of the invention; and

FIG. 6 is a sectional view of FIG. 5 along line 6—6.

Turning first to FIG. 1, there is shown a portion of a heat insulator gasket such as described in the Patent to Farnam et al, U.S. Pat. No. 3,655,210, issued Apr. 11, 1972. The heat insulating gasket 10 is fabricated, in this particular instance, of a central core member or laminate 12, here illustrated as being composed of two thicknesses 12a and 12b, being secured to one another by an adhesive bond layer 14. Laminate 12 may comprise a single or a plurality of individual laminae and should be of low thermal conductivity. A satisfactory type of material has been found to be a phenolic resin impregnated vegetable fiberboard having, on either side, a congruently shaped gasket layer 16 and 18 of suitable, conformable gasket material, such as fiber reinforced elastomeric material. Gasket layers 16 and 18 are adhered to elements 12a and 12b of laminate 12 by an adhesive layer omitted for purposes of clarity, but similar to layer 14 between elements 12a and 12b. Typical heat insulating core, gasket cover, and adhesive material, as well as methods of forming laminated gaskets, are disclosed in Farnam et al. U.S. Pat. No. 3,655,210. Sealing beads 17 and 19 may be formed from the same material as gasket layers 16 and 18, but will be of a lower density. This, too, is discussed in Farnam et al. U.S. Pat. No. 3,655,210.

The bolt hole portion 20 is provided with an oversized hole or aperture such as at 22 within which the annular reinforcing members of the invention are inserted. Insert member 24 is provided with an aperture such as 25 which forms a sized bolt hole opening to receive retaining bolts to be used in the final assemblage of the flanged components, such as a carburetor to intake manifold, etc. Sealing beads 17 and 19 may be formed on the gasket surface in accordance with the teachings of Farnam et al. U.S. Pat. No. 3,655,210. The specifics of member 24 will be described in detail as follows.

As best seen in the embodiment of FIG. 2, insert member or bushing 24 may have an annular groove 26 peripherally spaced so as to receive the flowing adhesive from bond line interface 14 and compacted core material flow to form a projection or shoulder to interlock the bushing to the gasket when the gasket structure is hot press formed. The flow of the resinous material is shown at 27 as filling the area of groove 26. The insert members 24 must be of a high strength low thermal conductivity material so as to retain the proper size for the bolt hole, as well to support the flange clamping loads of the heat insulating structure. The insert member generally will be of a solid molded construction, however, there may be instances where a laminated asbestos fiberboard or paper structure may be used, if machined to the particular specifications of the field of use.

The embodiment shown in FIGS. 3 and 4 is illustrative of the preferred embodiment of the invention. A continuous, medially projecting flange 28 is radially disposed about the body of the bushing or insert member 24a. The bushing is indexed in the gasket structure by means of this upstanding portion as follows: A central core portion 12b with an aperture 22 to receive the insert member is coated with an adhesive material such as shown at 14. The bushing or insert member 24a is inserted into the aperture, the projecting flange 28 serving to limit its downward travel. The mating central core portion 12a is placed in the structure being guided by the upstanding portion of bushing 24a. Gasket layers 16 and 18 may be applied, and the gasket structure is formed by hot pressing with or without provision for upstanding beads 17 and 19 by the methods disclosed in Farnam et al. U.S. Pat. No. 3,655,210.

It may be noted now that the projecting flange 28 underlies the central core portions and forms an interlocking shoulder such that the force necessary to dislodge the bushing will cause by shearing action, a tearing away of the structure of the core before removal may be accomplished. This force will be on the order of 200 to 500 pounds as compared with a push out force of about 15 to 200 pounds for cylindrical inserts or bushings.

As indicated at 30, the medial flange or shoulder 28 may be triangular in cross section. Several advantages become immediately apparent from this construction. The medial projection 28 underlies the core elements 12a and 12b. The bevelled or triangular cross section 30 indexes the bushing to center in the bond interface 14. And, unexpectedly, the angular surface when used in conjunction with resilient material is such that it will properly re-position the bushing when it is slightly dislodged. As the bushing is moved slightly out of place, the force tending to reseat it greatly increases.

The embodiment shown in FIGS. 5 and 6 illustrates the bushing 24b with a regular series of projections or shoulders 32. In section they are shown to be rounded as at 34. These projections 32 may be described as an interrupted flange. These projections form in the same general way as the triangular sectioned medial flange of FIGS. 3 and 4, but due to differences in geometry will tend to start to tear resilient material at a lower elastic limit. The initial force to displace the bushing slightly is higher, but the destructive effect of displacement follows more immediately.

There may be instances when the projections on the bushings of the invention will be rectangular in cross section. Such bushings will offer the highest resistance to displacement with the drastic, destructive results when displacements occur.

As was earlier mentioned, the push out force required to unseat the bushings of this invention is greatly increased over that force required for straight sided cylindrical bushings. With core materials of higher resiliencies, it generally requires less total force to remove any bushings, either prior art or those of this invention. However, due to the higher resiliency of the core material, the improved bushings tend to work themselves back into proper position when the distortion of the core is not so great as to be destructive.

METHODS OF MANUFACTURE

The bushings of this invention may be manufactured by molding or they may be machined from cores of material. They may be unitary pieces of material or laminated materials. Farnam et al. U.S. Pat. No. 3,655,210 gives examples of types of materials for insert members. Among these are phenolic filled asbestos millboard laminates, phenolic filled asbestos paper board laminates, solid molded plastics and metallic insert members. The essential criterion in selecting the material is whether it has a high compression strength to resist the pressing force under flange loads in the field of use. Another consideration for insulator gaskets is the thermal conductivity or $k$ factor of the material. There may be instances where metallic bushings made using the techniques of powdered metallurgy will be suitable for use in gaskets taught by this invention.

The method of making a particular bushing of a particular design will be dictated by the configuration of the design desired and will be readily apparent to those skilled in the art. It is noted that the ease of manufacture is greatest when molding unitary parts having a continuous medial flange.

The embodiment of this invention which an exclusive property or privilege is claimed as followed:

1. In a gasket structure of the type including a body portion composed of heat insulating material and having a bolt hole portion in which a relatively hard non-compressible preformed bushing is mounted to take a torque load when the gasket is clamped in place, the improvement in which said body portion comprises upper and lower halves laminated together with adhesive and in which the bushing and the laminated body portion halves in the medial area of the bushing have overlapping shoulders which provide a physical interlock between the bushing and the body portion of the gasket.

2. In a gasket structure of the type including a body portion composed of heat insulating material and having a bolt hole portion in which a relatively hard non-compressible preformed bushing is mounted to take a torque load when the gasket is clamped in place, the improvement in which said body portion comprises upper and lower halves laminated together with adhesive at the parting line between the laminations, said bushing in the medial area thereof having a peripheral shoulder projection entered between said upper and lower halves at said parting line to form interlocking shoulders between the bushing and said body portion, thereby to provide a mechanical interlock between the bushing and the body portion of the gasket structure and preclude separation of the bushing from the gasket structure under shear loads on the order of about 200 to 500 pounds push-out force.

3. The improvement as set forth in claim 2 wherein said interlocking shoulders are continuous.

4. The improvement as set forth in claim 2 wherein said interlocking shoulders are peripherally spaced.

5. The improvement as set forth in claim 2 wherein said interlocking shoulders are triangular in cross section.

6. The improvement as set forth in claim 2 wherein said interlocking shoulders are rounded in cross section.

7. The improvement as set forth in claim 1 wherein said shoulders are formed from gasket core material projecting into a medial groove.

* * * * *